United States Patent [19]

Kaul et al.

[11] 4,063,038

[45] Dec. 13, 1977

[54] ERROR CODING COMMUNICATION TERMINAL INTERFACE

[75] Inventors: Pradman Kaul, Gaithersburg; Ova Gene Gabbard, Germantown, both of Md.

[73] Assignee: Digital Communications Corporation, Gaithersburg, Md.

[21] Appl. No.: 634,387

[22] Filed: Nov. 24, 1975

[51] Int. Cl.² .............................................. H04J 3/02
[52] U.S. Cl. ........................... 179/15 BA; 179/15 AE
[58] Field of Search ........ 179/15 BA, 15 BS, 15 AV, 179/15 BF, 15 A, 15 BL, 15 AE; 340/146.1 AQ, 146.1 A

[56] References Cited

U.S. PATENT DOCUMENTS

| | | | |
|---|---|---|---|
| 3,303,333 | 2/1967 | Massey | 340/146.1 AQ |
| 3,534,264 | 10/1970 | Blasbalg et al. | 179/15 AE |
| 3,707,680 | 12/1972 | Gabbard et al. | 179/15 AE |
| 3,825,899 | 7/1974 | Haeberle et al. | 179/15 BA |
| 3,838,221 | 9/1974 | Schmidt et al. | 179/15 BS |

OTHER PUBLICATIONS

"IBM Technical Disclosure Bulletin," by Clark & Frey, vol. 11, No. 8, Jan. 1969, pp. 910 & 911.
"A TDM System for Asynchronous High-Rate Telemetry," by Appel & Pardoe, APL Technical Digest, Oct. 1971, pp. 2-12.

Primary Examiner—Douglas W. Olms
Attorney, Agent, or Firm—Pollock, Vande Sande & Priddy

[57] ABSTRACT

A communication terminal interface accepts, on different channels, information in a plurality of formats for communication purposes over a communication link which may be a TDMA satellite link. Each channel is accepted by a different interface unit which serves to format the information for communication over the system. This unit includes a compression-expansion buffer memory for allowing information received at a receive rate $R_s$ to be multiplexed and transmitted at a transmission rate $T_s$ which may be many times higher than the receive rate. In addition some units may include forward acting error correcting coding selected to provide the necessary corrected bit error rate for the type of information accepted by the unit and the capacity of the communication link over which the information is to be transmitted. The transmitter may employ differential encoding. To avoid increasing the error rate, which would normally result from this type of encoding, the encoded data is interleaved at the transmit side such that adjacent errors, after de-interleaving, on the receive side, are sufficiently displaced such that they may be corrected by the error decoding.

12 Claims, 6 Drawing Figures

FIG. 1.

FIG. 2.
Rate 7/8 Encoder

FIG. 4A.

ERROR CODING COMMUNICATION TERMINAL INTERFACE

FIELD OF THE INVENTION

The present invention relates to communication systems and, more particularly, to the interface unit for properly formatting the received information such that it may be efficiently transmitted over a communication link.

BACKGROUND OF THE INVENTION

Many satellite communication systems have been designed, and some have been built and are operating. The ultimate goal of any of these systems is to provide the most efficient communication system with due regard for the format in which information is received for transmission purposes, as well as the capital expenditures required for construction of the system. In designing such a system there are, of course, many trade offs that can be made by varying different parameters such as the size of the antenna and the power which is to be transmitted. For instance, by increasing the size of the antenna and the power handling capacity of such antenna, the rate at which information is transmitted can be increased while at the same time maintaining the bit error rate. Of course, this increase in system capacity is paid for by the increased cost of building and operating the system. The first large scale communication system of this type which has been built and is operating employs the Intelsat satellite. In this system the antennas are relatively large (approximately 90 feet in diameter) and thus a reasonable bit error rate is maintained for the rather high transmission rate (64 megabits per second) of the system.

On the other hand, a second system which has been built and is operating employs the ANIK satellite (Telesat) in which the size of the antennas has been drastically reduced. In order to maintain the bit error rate at reasonable values (such as $1 \times 10^{-6}$) for a transmission rate of 61 megabits per second, various well known techniques have been employed. One of these techniques is the use of forward acting error correcting coding networks on the transmit side, and corresponding decoding networks at the receive side. For example see Gabbard et al "The Telesat Common TDMA Terminal Equipment," Proceedings of the International Conference on Communications, San Francisco, June 1975.

The Telesat system employs TDMA techniques and thus it transmits different channels of data in a burst mode. This technique in turn, imposes certain requirements on the terminal. Thus, each different channel may be accepted by a different interface unit and each of the interface units may include a compression-expansion buffer memory (see U.S. Pat. No. 3,838,221) which operates to allow the burst mode transmission. More particularly, information may be received at a receive rate $R_s$. A terminal may accept a plurality of different channels substantially simultaneously. Any terminal is allowed to transmit in a particularly determined time slot in a repetitive time frame. Each station's burst is divided into a plurality of sub-bursts, one for each of the different channels of information which is accepted for transmission purposes. Information which is received between bursts at any terminal is stored in the compression memory such that when that terminal's time slot occurs, the information can be transmitted at a relatively high transmission rate $T_s$. Furthermore to transmit information from a plurality of channels each of the compression memories associated with different ones of the interface units is enabled for the sub-burst period associated with that interface unit to allow the information accumulated to be transmitted. On the receive side a complementary operation occurs where the information received is written into an expansion memory and the information is read out of the expansion memory at a slower rate than the information is received. In this fashion burst transmissions are enabled at the relatively high $T_s$ rate while the average rate of information transmission is equal to no more than the receive rate $R_s$.

Due to the smaller antennas in the Telecast system forward acting error correcting coding has been employed. At the transmitting terminal this is implemented by employing a forward acting error correcting coding network on the transmit side of the compression-expansion memory. In this fashion, a single error correcting network operates on all transmitted data in any terminal and codes the information for transmission purposes. In a like fashion a decoding network is employed at the receive side of the receiving terminal such that the information received is decoded and then made available to the expansion memory in each of the different interface units.

Although this arrangement meets system requirements, i.e., it decreases the apparent bit error rate of the communication link to desired levels it does have a number of disadvantages. For once thing, the error correcting coding and decoding networks must operate at the relatively high transmit rate. Thus, the networks are relatively expensive. However, more importantly, the different formats which information is received for transmission purposes require different channel bit error rates for proper transmission. Thus, directly encoded PCM, whether speech or data may only require a bit error rate of $10^{-4}$. On the other hand for direct digital data channels a bit error rate of $10^{-7}$ is desired and for direct super group coding a bit error rate in the range of $10^{-6}$ to $10^{-7}$ is desired. The use of a single encoder-decoder pair operating on data received from the compression memory and providing data to the expansion memory must be designed to meet the most stringent requirements for the channels that the station is to handle. Clearly the apparent channel bit error rate will be less than required for some formats and, to that extent, the cost-effectiveness of the system can be improved.

It is therefore one object of the present invention to provide a terminal interface unit which allows the forward acting error correcting coding to provide a channel bit error rate which is selected to improve the un-coded channel bit error rate which is selected to improve the uncoded channel capacity to the extent required by the type of information which is to be transmitted. It is another object of the present invention to provide a terminal interface unit which includes forward acting error correcting coding operating at the relatively slower receiving rate $R_s$ rather than the relatively higher transmission rate $T_s$.

It is another object of the present invention to provide such an interface for use with differentially encoded PSK by interleaving adjacent bits before encoding and de-interleaving to separate adjacent encoding caused errors for correction by the error correcting de-coding.

SUMMARY OF THE INVENTION

The present invention meets these and other objects by providing for an interface unit which includes an interfacing means (for instance a digital encoder/decoder or multiplexer/demultiplexer) and a compression-expansion buffer memory for receiving data at the relatively slow receiving rate $R_s$ and making it available to the transmitting apparatus at the relatively higher transmission rate $T_r$. Each of the different terminal interface units may include a forward acting error correcting coding network which is selected to improve the uncoded channel bit error rate to the extent required for proper transmission of the information which the interface unit is accepting. For instance, some channels may not need error correcting coding at all thus, the interfacing means may be directly connected to the compression-expansion buffer memory. For other channels, however, seven-eighth rate forward acting error correcting coding may be necessary to decrease the apparent bit error rate of the communication link to that required for proper transmission. For still other types of information formats more stringent bit error rates are required and thus, three-fourths rate encoding may be provided in the interface units which is to accept that type of information.

Since differential encoding is generally used to resolve phase ambiguity and, furthermore, since such coding increases the bit error rate the compression-expansion memories are adapted to interleave bits of information for transmission purposes from nonadjacent locations in the memory. In this fashion, after de-interleaving occurs at the receive side, the increased number of errors, which may be caused by the differential encoding, are sufficiently widely separated such that the error decoding can separately correct each of the different errors.

BRIEF DESCRIPTION OF THE DRAWINGS

In the drawings appended hereto like reference characters identify identical apparatus and.

DETAILED DESCRIPTION OF PREFERRED EMBODIMENTS

Figure 1:
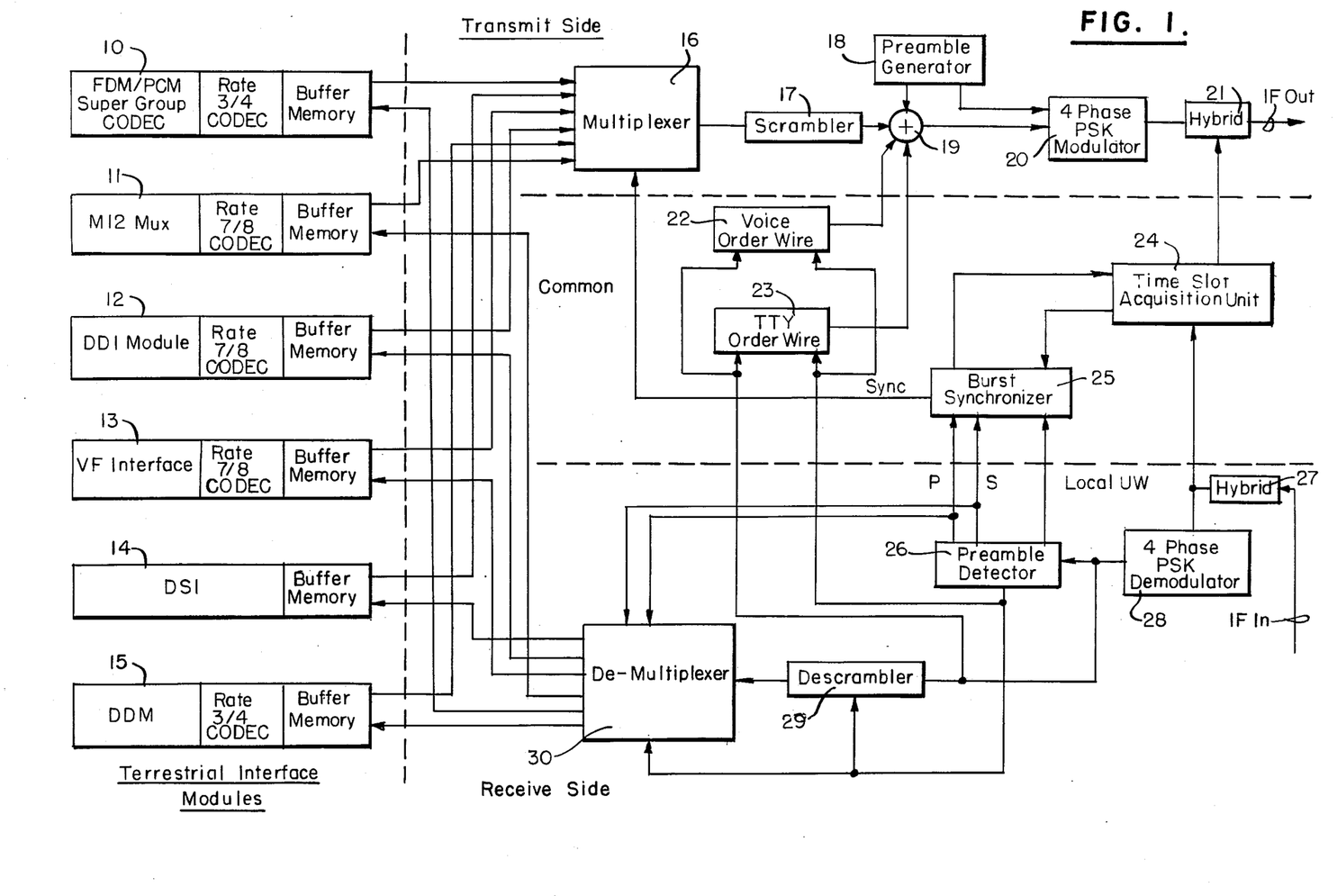
FIG. 1 is a block diagram of a typical terrestrial terminal constructed in accordance with our invention.

FIG. 1 illustrates, in block diagram form, a typical terrestrial terminal employing our invention. The equipment in the terminal can be broken down into common equipment and a plurality of interface modules. The interface modules which form the subject matter of this invention perform multiplexing/demultiplexing, PCM encoding/decoding and sub-burst compression/expansion functions in order to efficiently interface the available terrestrial signal forms (i.e., voice, data, super groups, etc.) with the common TDMA equipment.

Each of the interface modules is designed as a stand alone attachment to the common equipment to provide maximum flexibility and economy in constructing the overall TDMA system. The types of interfaces needed in any one location can significantly differ from the types of interfaces needed at other locations. Accordingly, the interface modules for the two locations will usually be quite different. In addition, forward acting error correcting coding is employed with the capability of matching the particular error coding to the relation between the data service and the effectiveness of the uncoded terminal-satellite-terminal links.

In particular, each of the interface modules 10 through 15 interface with the common equipment through a multiplexer 16 and demultiplexer 30. The multiplexer 16 makes available to each of the interface modules 10–15 timing signals so that each interface may transmit its data to the multiplexer 16 at the proper time. The data from each of the different interfaces is referred to as a sub-burst. The common equipment receives the sub-bursts and combines them with the preamble to form a data burst. The demultiplexer 30 performs the inverse operation, that is it receives each of the sub-bursts and directs each sub-burst to its respective interface. Both the multiplexer 16 and demultiplexer 30 can operate with a variety of different interfaces and the interfaces shown in FIG. 1 are merely exemplary. Furthermore, in order to provide flexibility the multiplexer 16 and demultiplexer 30 can cooperate with different groups of interfaces, i.e., groups different than the ones shown in FIG. 1.

Each interface module includes a buffer memory 30 for data rate compression-expansion functions. The module may or may not include a forward acting error correcting codec such as the rate three-fourths codec in module 10, the seven-eighths rate codec in module 11 or no codec in module 14.

Burst synchronizer 25 operates to control the timing of each stations transmitter by providing a synchronization signal to the multiplexer 16. The multiplexer 16 serves to synchronize the preamble generator and at the appropriate time, allows data from each of the connected interfaces to reach the scrambler 17. When the preamble generator 18 is enabled, by a signal from the multiplexer 16, it begins generating the preamble. The preamble generator 18 generates a plurality of enabling signals and provides them to an OR gate 19 to enable each of the different components of the preamble to be made available to the modulator 20. At the conclusion of the preamble, multiplexer 16 allows the first data sub-burst to reach the scrambler 17. At the conclusion of that sub-burst another sub-burst is made available to the scrambler 17, and so on. Scrambler 17 is provided to reduce the power flux density transmitted when the information contains fixed data patterns. The scrambler 17, and corresponding descrambler 29 are known to those skilled in the art, therefore a detailed description thereof is not necessary. One typical manner of operating a scrambler 17 may be by employing modulo-2 addition of the digital data stream with a pseudo-random sequence.

Thus, the location of any particular stations data burst, within the frame, is controlled by the burst synchronizer 25 providing the sync signal to enable the multiplexer 16 to begin transmission of the data burst. The burst synchronizer 25 has provided to it information from the time slot acquisition unit 24 which operates during initial acquisition in a manner well known to those skilled in the art. See for instance Maillet, U.S. Pat. No. 3,813,496. In addition, the burst synchronizer 25 receives timing information from the receiver at any station through the demodulator 28 and preamble detector 26. In particular, preamble detector 26 is capable of detecting both the sync burst (or bursts) as well as the respective stations own data burst. Each of these bursts carries a unique word and the preamble detector 26 responds to the unique word in the sync burst (or bursts) as well as to the unique word in the local stations data burst. This provides the synchronizer 25 with a reference from which to time its own data burst as well as with information regarding the positioning of the data burst with respect to its proper position. This latter information is used for fine control of the position of the data burst in the frame. One example of apparatus to provide this function with a single sync burst is found in the Gabbard Pat. No. 3,562,432.

In order to more particularly explain the manner in which the inventive apparatus is constructed and operates, the various components of an interface module will now be described.

The portion of each interface module which receives the terrestrial signal (referred to as interface means) is selected for the particular function required. Thus, the interface means of module 10 is an FDM/PCM super group coder. This accepts FDM super group signal (240 khz bandwidth) and performs PCM encoding on transmitted signals and decoding on received signals. The construction of this apparatus is not further described herein as its construction is well known to those skilled in the art. The interface means of module 11 is a M12 multiplexer. This is standard apparatus which accepts four T1 signals (each 1.5 Megabits) and outputs a 6 Megabit T2 signal for transmission and performs the reverse operation on received signals. The detailed construction of this apparatus is not described here as it is well known to those skilled in the art. In like fashion the well known direct digital interfacing means of module 12, the voice frequency interfacing means of module 13, the digital speech interpolation interfacing means of module 14 and the digital data mutiplex interfacing means of module 15 are not further described herein.

Figure 2:
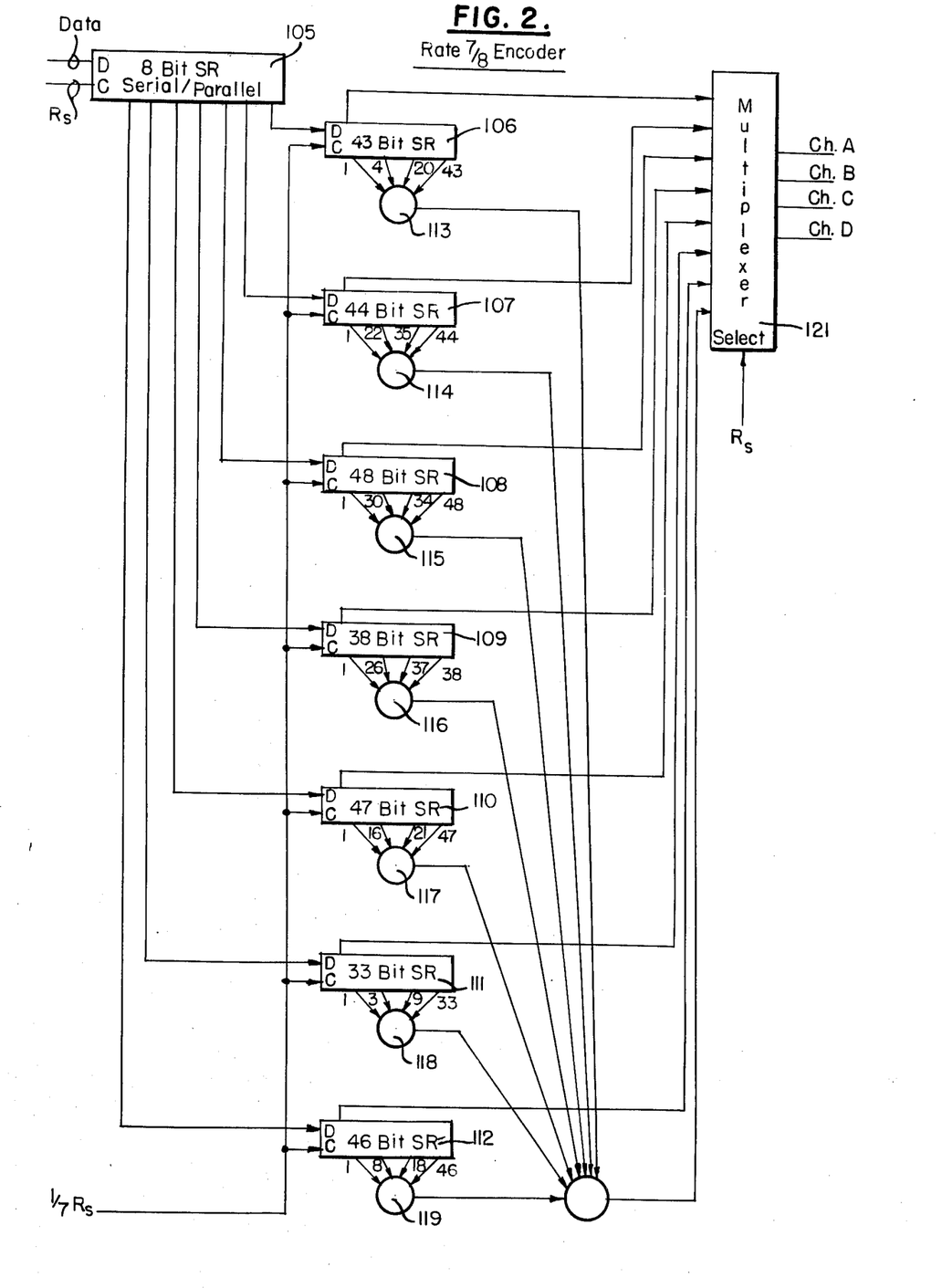
FIG. 2 is a detailed block diagram of a typical forward acting error correcting encoder which may be used in our inventive system.

FIG. 2 illustrates a detailed block diagram of a typical rate seven-eighths convolutional encoder which may be employed as the forward acting error correcting coding network. The encoder comprises a plurality of shift registers 105 through 112. The length of each of these shift registers is represented in FIG. 2. Shift register 105 is clocked at a rate $R_s$ which is the nominal rate at which data is received. The other input to shift register 105 has provided to it data in the form information is received from the data source. Shift register 105 has seven different outputs, a different one provided to each of registers 106 through 112. Again, the length of each of registers 106 through 112 is indicated in the diagram. The other input to each of these registers is provided by a clock operating at a rate of one-seventh $R_s$. Each of shift registers 106 through 112 provides a plurality of outputs for a different one of OR gates 113–119. The particular stage of the shift register which provides the output to the associated OR gate is specified in FIG. 2. The outputs of OR gates 113–119 are OR'ed in OR gate 120. The output of OR gate 120 is the parity bit which is provided as an input to a multiplexer 121. In addition, each of registers 106 through 112 provides an output to multiplexer 121. Multiplexer 121 receives an additional input which is a clock signal at the rate $R_s$.

This encoder accepts serial data stream at a rate $R_s$ in a serial to parallel converter which consists of shift register 105. The output of this conversion process produces seven parallel data streams each at a rate of one-seventh $R_s$. This information is then clocked into the different shift registers 106–112 by the one-seventh $R_s$ clock. To generate parity bits for every seven data bits each register is tapped at 4 points defined by the code on which the encoder is based. The output of the tapped stages, 28 in total, are then half added using exclusive OR gates to generate a parity bit. The seven data streams along with the parity stream, each at one-seventh $R_s$ is converted to a four-third $R_s$ rate for transmission over the channel. This particular encoder is based upon the generator polynomial:

$$G_0(D) = 1 + D^3 + D^{19} + D^{42}$$

$$G_1(D) = 1 + D^{21} + D^{34} + D^{43}$$

$$G_2(D) = 1 + D^{29} + D^{33} + D^{47}$$

$$G_3(D) = 1 + D^{25} + D^{36} + D^{37}$$

$$G_4(D) = 1 + D^{15} D^{20} + D^{46}$$

$$G_5(D) = 1 + D^2 + D^8 + D^{32}$$

$$G_6(D) = 1 + D^7 + D^{17} + D^{45}$$

With this code the constraint length $(n_a)$ is equal to 376 bits and the guaranteed error correction is two errors within that constraint length. The output of the encoder is provided on four serial output lines respectively labled channel A through channel D.

Before describing the manner in which the compression-expansion buffer memory receives this data and provides bit interleaving we shall first disclose the decoder which corresponds to this encoder.

Figures 3, 4B:
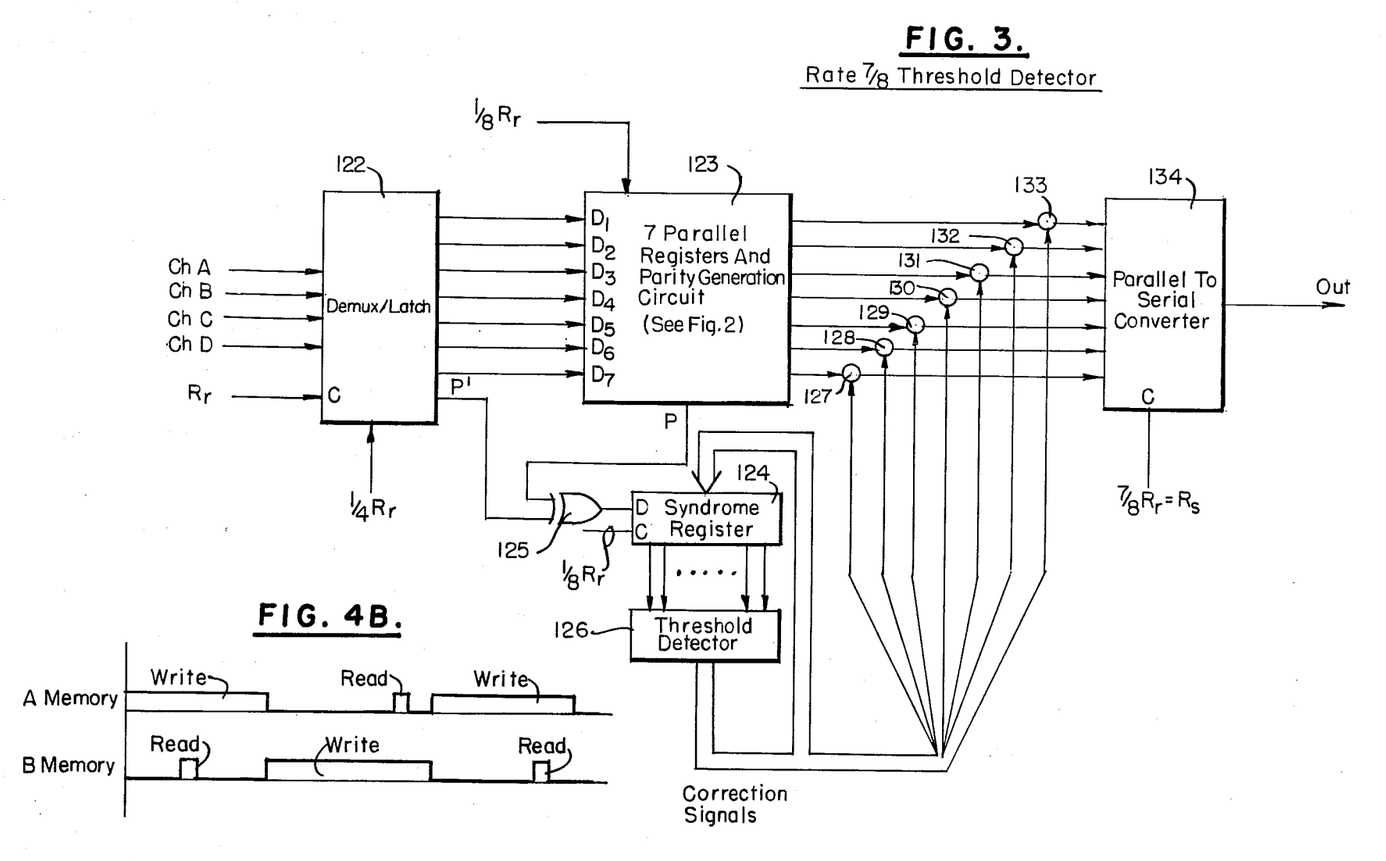
FIG. 3 is a block diagram of a typical forward acting error correcting decoder which may be used in our inventive system.
FIG. 4B is a timing diagram showing read-write operations.

FIG. 3 is a detailed block diagram of the rate seven-eighth decoder. Each seven-eighth codec illustrated in FIG. 1 includes both an encoder and decoder. Of course, the encoder operates to encode the data received from a terrestrial source by the interface unit of which the codec is a part. On the other hand, the decoder serves to decode information received from the satellite by the terminal at which the codec is a portion of an interface unit.

More particularly, in FIG. 3 four channels of data from the expansion buffer memory are provided to a demultiplex/latch unit 122 which also receives clocking input signals to clock in the received data at a receive rate $R_r$. The latch itself is operated by clocking signals received at a rate one-fourth $R_r$ for output purposes. The demultiplex/latch unit 122 provides seven output lines to unit 123. An eighth output, which comprises the received parity signal is provided as one input to exclusive OR gate 125. The unit 123 includes seven parallel registers and a parity generating circuit such as that shown in FIG. 2. In particular, unit 123 includes apparatus equivalent to shift registers 106 through 112 with their associated OR gates 113–119 as well as OR gate 120. The estimated parity bit, which is generated by unit corresponding to OR gate 120 is provided as the other input to exclusive OR gate 125. The seven outputs from the different shift registers corresponding to shift registers 106–112 are provided as outputs of the unit 123.

The unit 123 also receives a clocking signal at a rate one-eighth $R_t$ which is employed to clock the different shift registers corresponding the shift registers 106–112. The output of exclusive OR gate 125 is provided as one input to syndrome register 124 are provided to a threshold detector 126. The output of threshold detector 126 provides another input to syndrome register 124 as well as correction signals to each of a plurality of OR gates 127–133 associated with the different ones of the outputs of unit 123. The other input to each of these OR gates is, of course, different one of the outputs of unit 123. Finally, the output of each of the OR gates 127–133 is provided to parallel to serial convertor 134 which is also provided with a clocking input at seven-eighth $R_t$ which in turn is equal to the original $R_s$.

The decoder illustrated in FIG. 3 receives four data streams from the expansion memory. These are clocked into a latch 122 and demultiplexed into eight different streams. Seven of the eight streams are clocked into seven registers (each 48 bits long) by a one-eighth $R_t$ clock. The eighth stream, which is the received parity bit, is compared with the estimated parity bit. The estimated parity bit is generated in unit 123 by half adding the decoder register tap output (which are exact duplicates of the encoder taps) using the same method as in the encoder. The result of the comparison between the received parity bit and the estimated parity bit is called the syndrome bit. If there is a mismatch the syndrome equals 1, and if there is a match the syndrome equals 0. This syndrome is shifted into the syndrome register at a one-eighth $R_t$ rate.

As a particular data bit travels the length of its respective register it generates four syndromes. When the data bit reaches the end of the register the four syndromes pertaining to that bit are summed and compared, in threshold detector 126, with a threshold of three. If the sum is greater than or equal to three, a correction pulse is generated for that bit and fed to the output of the register, the synchronization circuitry and the syndrome register. At the output of the register, that is at each of OR gates 127–133 it is used to compliment the data which is in error. At the syndrome register the syndrome is complimented since it was generated by a bit in error and was therefore inverted during generation. A threshold of three guarantees a correction of two errors. If the data bit in question was the only bit in error, then the sum of the syndrome will equal four which is greater than the threshold. If another bit used in generating the syndrome was also in error, the sum of the syndromes will now be three, since the second error bit tends to correct one of the syndromes. However, since it is equal to the threshold of three it will therefore generate a correction pulse. Thus, at least two bit errors can be corrected within the constraint length. The corrected data sequences are recombined and emitted at a serial rate of seven-eighth $R_t$ since the parity bit has been stripped from the incoming information.

Figure 4A:
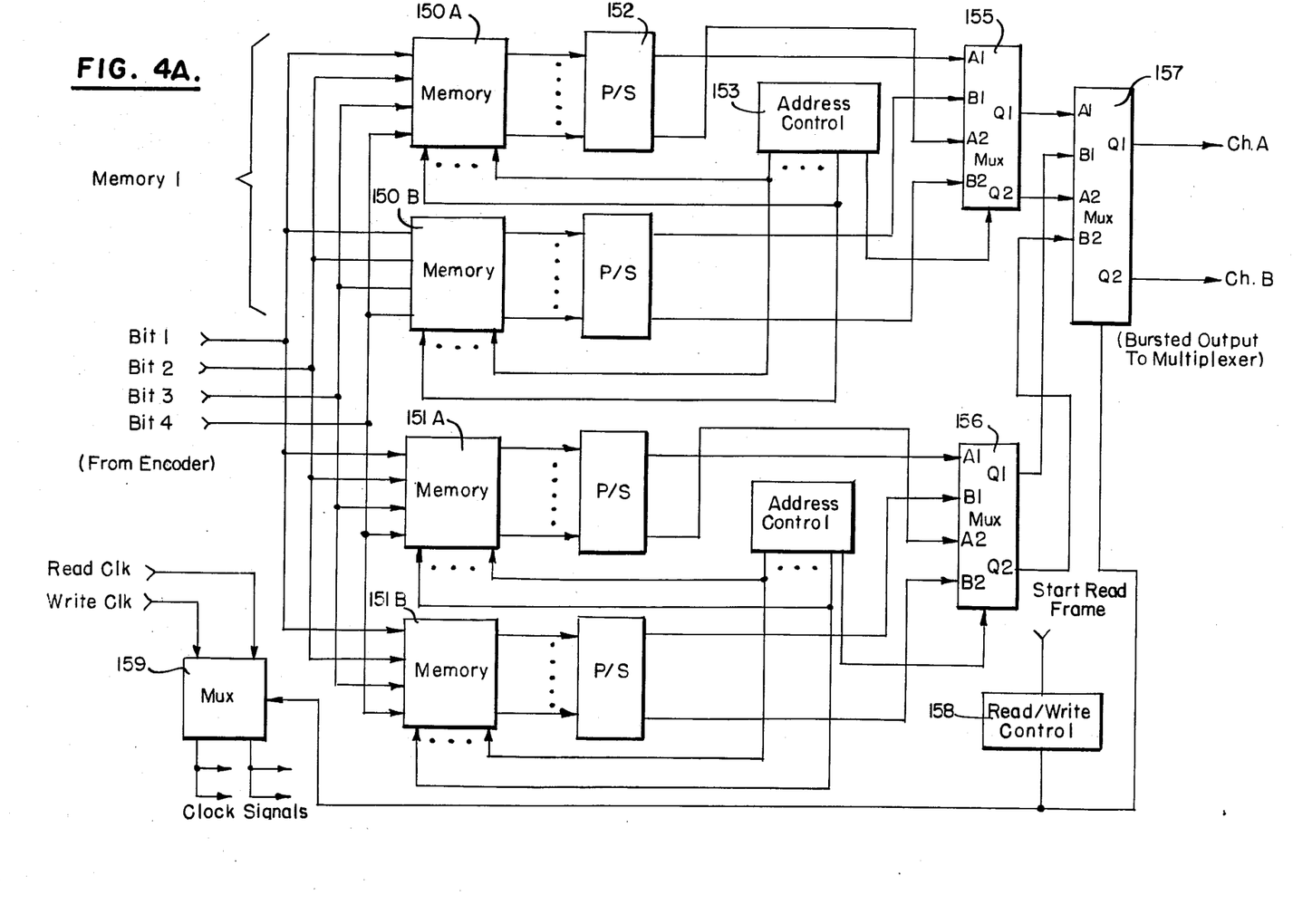
FIG. 4A is a block diagram of a compression memory employed in our inventive system.
Figure 5:
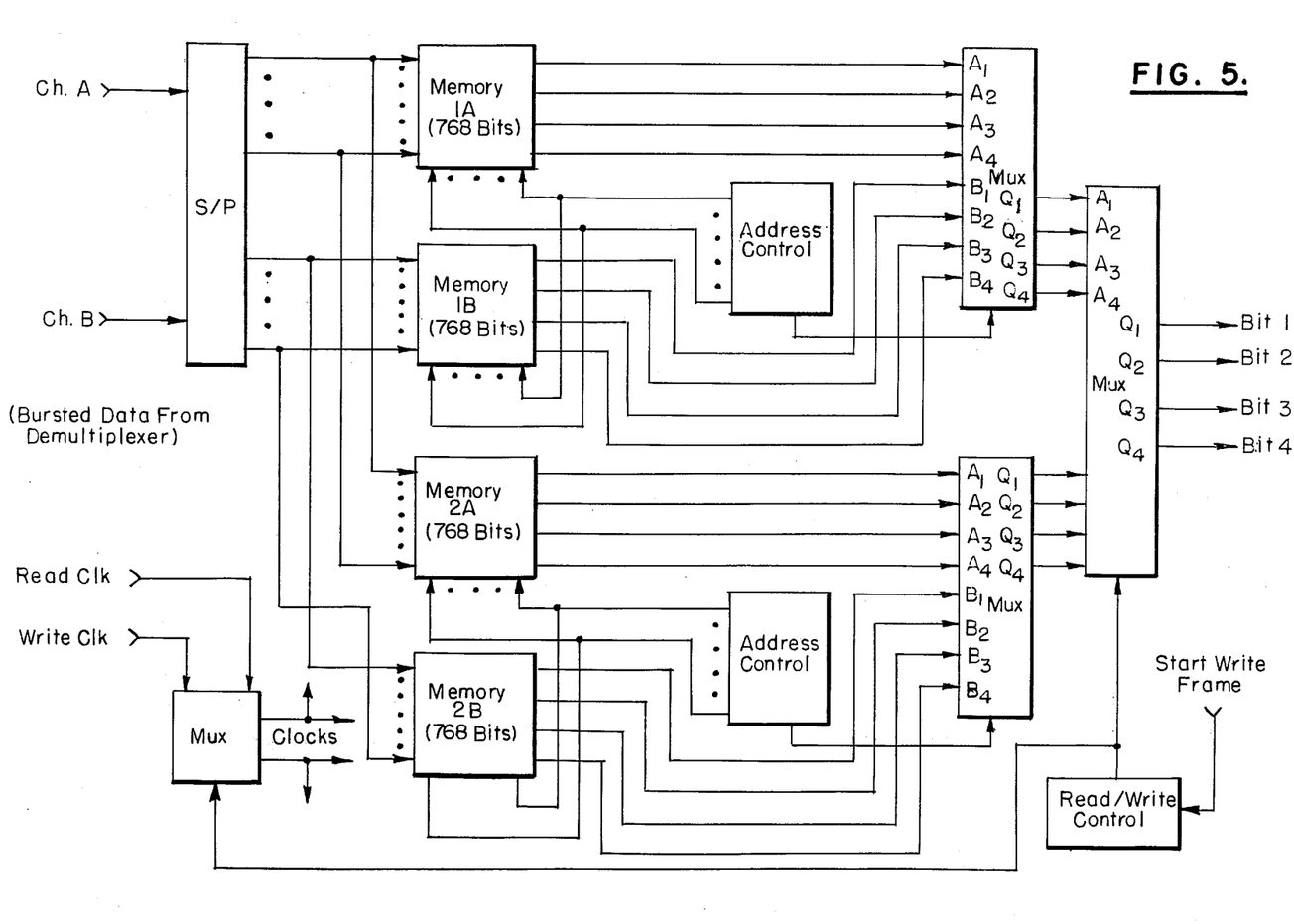
FIG. 5 is a block diagram of an expansion memory which may be used in our inventive system.

Now that we have disclosed a typical seven-eighth rate encoder and decoder, we can refer to FIGS. 4 and 5 which illustrate, respectively, the compression memory block diagram and the expansion memory block diagram. Those skilled in the art will understand that the error codec disclosed here is one example only and other digital error correcting networks could also be used. The buffer memory illustrated in FIG. 1 includes both a compression memory and an expansion memory. The compression memory is provided with signals from the error correcting encoder and, correspondingly, the expansion memory provides signals to the error correcting decoder.

Referring now to FIG. 4A it will be seen that the four bit streams provided by multiplexer 121 (FIG. 2) are provided as inputs to the compression memory. The compression memory is the portion of the buffer memory that transforms the continuous information signal received by the interface unit to a bursted data stream for a transmission and, the expansion memory is the apparatus which transforms the received bursted data stream to a continuous data output. The compression memory, as is illustrated in FIG. 5, includes a pair of memories, each of which includes a pair of memory banks. Each memory of the pair is provided with a capacity to store a single sub-burst. Thus, those of ordinary skill in the art will understand the manner in which to select the size of each memory bank based upon the sub-burst period and the transmission rate $T_r$. In particular, memory banks 150A and 150B comprise a first or A memory in the compression memory and memory banks 151A and 151B comprise the second or B memory. During one TDMA frame memory A stores data provided by the encoder. In the next frame the roles of memories A and B are interchanged so that memory B stores data from the encoder and memory A outputs the previously stored data as a burst. In the next frame, again, the roles of memories A and B are again interchanged, and so on. This operation is diagramatically illustrated in FIG. 4B which illustrates the operations performed by memory banks A and B and the time periods in which the different operations are performed. More particularly, in a first period of time memory A is writing data provided by the encoder. During a shorter interval during this period memory B reads out previously stored data. Although FIG. 4B is not drawn to scale those of ordinary skill in the art will understand that the shorter period of the read operation implies transmission at a higher data rate then the data rate employed in the writing operation, which takes a longer period of time. In the next time interval the roles are interchanged such that the B memory writes whereas the A memory reads. Finally, in the next interval of time the roles are again interchanged, and so on.

For writing purposes a write clock is supplied via multiplexer 159 to the memory banks which are engaged in the writing operation. Similarly, a read clock, which is relatively faster than the write clock, is also supplied to the appropriate memories, again by multiplexer 159. Multiplexer 159 is controlled by the output of read/write control 158. The read/write control 158 can be any bistable device capable of assuming one of two different states. Read/write control 158 is switched between its two states by the signal START READ FRAME.

In addition to being supplied with the appropriate clock each of the memories is also supplied with address control signals by address control units 153 and 154.

In the read mode the output of the reading memory is converted from parallel to serial form by an associated parallel/serial convertor 152.

In the write mode data is written into the memories in sequential order thus, for instance, if each bank is capable of storing 665 bits then bits 1–664 are sequentially written into memory bank 150A and subsequent bits, that is bits 665–1330 are written into memory bank 150B. To this end, therefore the address control 153 which controls the manner in which data is written into each of the memory banks can comprise a simple counter. This counter is, of course, operated by the write clock.

In the read mode, however, in order to seperate adjacent bits the output of the memories are interleaved such that bit 1 is followed by bit 665, etc. Actually, each memory bank provides two streams of outputs, for instance, one odd numbered stream and one even numbered stream. Therefore, the odd numbered stream would comprise bits 1, 665, 3, 667, etc. The even numbered stream would comprise bits 2, 666, 4, 668, etc. In order to control this reading operation the address control 153 operates memory banks 150A and 150B simultaneously. The bit stream outputs from each of the parallel/serial convertors 152 associated with memory banks 150A and 150B are applied to different inputs of a multiplexer 155. Multiplexer 155 also receives an additional control signal from the address control 153. It is the multiplexer 155 which actually performs the interleaving operation by sequentially allowing the data from either memory bank 150A or 150B to pass the multiplexer. The output of the multiplexer 155 is provided as a pair of inputs to an additional multiplexer 157.

The memory banks 151A and 151B are controlled in a similar fashion by address control 154 and multiplexer 156. The outputs of multiplexer 156 are also provided to multiplexer 157. Multiplexer 157 is controlled by the output of read/write control 158 in accordance with which of the two memories are reading. The output of multiplexer 157 comprising channels A and B are provided to the multiplexer 16 (see FIG. 1).

FIG. 5 illustrates the corresponding expansion memory. Like the compression memory, the expansion memory comprises a pair of memories, one for high speed writing and the other for lower speed reading. Each of the memories is broken up into two memory banks in order to perform a de-interleaving operation, corresponding to the interleaving operation performed by the compression memory. The input from the multiplexer is applied to a serial/parallel convertor 200. The de-interleaving process is effected by writing adjacent bits into different ones of the memories. Thus, a first memory comprises memory banks 201A and 201B, and the second memory comprises memory banks 202A and 202B. Similar to the compression memory, while memory 201 is reading, memory 202 is writing, and vice versa. Read and write clocks are provided to multiplexer 203 and the appropriate clock is applied to the memories via the multiplexer. The multiplexer 203 is under control of read/write control 204 in response to the START WRITE FRAME control.

When memory 201 is writing, address control 205 controls both of the memories simultaneously to write data in sequential positions. Thus, for instance, adjacent bits such as bit 1 and bit 665 are written respectively into memories 201A and 201B. Bits 2 and 666 are again written sequentially into respectively memories 201A and 201B. In this fashion, at the conclusion of the writing operation memory 201A stores bits 1–664 and memory 201B stores bits 665–1330, in the same fashion that the compression memories stored these bits. In the reading operation, the memories are operated sequentially such that the memory 201A is entirely read out before memory 201B begins reading. The outputs from each of the memories are provided as an input to multiplexer 207. An additional control from address control 205 enables multiplexer 207 to make available, at its output the proper signals, that is either signals from memory 201A or 201B.

In a similar fashion address controls 206 enables reading and writing from memory banks 202A and 202B. The outputs from these memories are made available to multiplexer 208. The outputs from both multiplexers 207 and 208 are provided to a multiplexer 209 which, under control of read/write control 204 provides the proper output to an appropriate rate decoder if the interface module contains such a rate decoder.

In the foregoing description we have described only the rate seven-eighth decoder. Those of ordinary skill in the art will understand how a rate three-fourth encoder and decoder may be designed. One rate three-fourth encoder and decoder which has been employed by us has used the following generator:

$$G_0(D) = 1 + D^3 + D^{15} + D^{19}$$

$$G_1(D) = 1 + D^8 + D^{17} + D^{18}$$

$$G_2(D) = 1 + D^6 + D^{11} + D^{13}$$

The characteristics of this code are:

$d_{min} = 5$ (hamming distance)
constraint length = 80 bits
guaranteed error correction = 2

Thus, we have described a TDMA terminal which includes a novel interface module for interfacing the terrestrial communication systems to the satellite link. In particular, each interface module includes a compression/expansion buffer memory and each module may also include, on the low speed side of the interface, a forward acting error correcting coder/decoder network. Furthermore, this network can be selected so as to achieve the necessary bit error rate improvement required for the type of data to be transmitted. In this fashion, the error correcting coding can be optimized for the type of information being transmitted rather than employing the highest rate and coding required at the terminal. As a further advantage from using the inventive apparatus described herein the error coding/decoding can be employed on the low speed side of the terminal rather than on the high speed side.

In the description of our invention we have indicated that data is written sequentially into each of the banks of the compression memory. Read out occurs alternately from each bank. The expansion memory performs the inverse operation, i.e., writing occurs alternately and reading occurs sequentially. It is also within the scope of our invention to operate in the converse fashion, i.e., data is written alternately into the two banks of a compression memory. Read out may then occur sequentially. Writing can then be effected sequentially into the expansion memory, and read-out can then be effected alternately.

We claim:

1. Apparatus for interfacing a plurality of terrestrial communication links to a TDMA communication system including a remote transponder, comprising:
   a plurality of interface modules, each including a compression/expansion memory means for increasing the nominal clock rate of data flowing from one of said terrestrial links toward the transponder and for decreasing the nominal clock rate of data flowing from the transponder toward one of said terrestrial links, each of said memory means thus establishing low speed data on one side adjacent one of said terrestrial links and a higher speed data on the side opposite to said one side, selected ones of said modules further including forward acting error correcting coding/decoding means connected to said memory means on the terrestrial side thereof, said compression/expansion memory means including a separate compression memory and a separate expansion memory.

said compression memory including a pair of memories each of which includes a pair of memory banks, said expansion memory including a pair of memories, each of said memories including a pair of memory banks, address control means for each of said compression memory banks to control writing data into said compression memory banks in sequential order and to control reading from said compression memory banks in interleaved fashion.

2. The apparatus of claim 1 in which said address control means reads a bit from the first compression memory bank immediately followed by reading the next sequential bit from said second compression memory bank.

3. The apparatus of claim 1 which further includes second address control means for each of said expansion memory banks to control reading the data from said expansion memory banks in sequential order and to control writing into said expansion memory banks in interleaved fashion.

4. The apparatus of claim 3 in which said second address control means writes a bit into a first expansion memory bank immediately followed by writing the next sequential bit into said second expansion memory bank.

5. The apparatus of claim 1 wherein said forward-acting error correcting coding/decoding means comprises convolutional encoder/decoder.

6. The apparatus of claim 5 wherein a first of said selected interface modules includes a rate seven-eighth encoder/decoder and a second selected interface module includes a rate three-fourth encoder/decoder.

7. An interface module for interfacing a terrestrial communication link to a TDMA communications system including a remote transponder, said interface module including:

a compression/expansion memory means for increasing the nominal clock rate of data flowing from said terrestrial link toward said transponder and for decreasing the nominal clock rate of data flowing from said transponder toward said terrestrial link, said module further including a forward acting error correcting coding/decoding means connected to said memory means on the side thereof adjacent said terrestrial link, said compression/expansion memory means including a separate compression memory and a separate expansion memory, said compression memory including a pair of memories, each of which includes a pair of memory banks, said expansion memory including a pair of memories, each of which includes a pair of memory banks, address control means for each of said compression memory banks to control writing data into said compression memory banks in sequential order and to control reading from said compression memory banks in interleaved fashion.

8. The apparatus of claim 7 in which said address control means reads a bit from a first compression memory bank immediately followed by reading the next sequential bit from said second compression memory bank.

9. The apparatus of claim 7 further including second address control means for each of said expansion memory banks to control reading data from said expansion memory banks in sequential order and to control writing into said expansion memory banks in interleaved fashion.

10. The apparatus of claim 9 in which said second address control means writes a bit into a first expansion memory bank immediately followed by writing the next sequential bit into said second expansion memory bank.

11. The apparatus of claim 7 wherein said forward acting error correcting coding/decoding means comprises a rate seven-eighth encoder/decoder.

12. The apparatus of claim 7 wherein said forward acting error correcting coding/decoding means comprises a rate three-fourth encoder/decoder.

* * * * *